United States Patent
Peng et al.

(10) Patent No.: US 9,307,476 B2
(45) Date of Patent: Apr. 5, 2016

(54) USER EQUIPMENT AND METHOD FOR PICO-CELL ATTACHMENT AND ATTACHMENT INHIBITING

(75) Inventors: Yuefeng Peng, Beijing (CN); Yujian Zhang, Beijing (CN); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,739

(22) PCT Filed: Mar. 29, 2012

(86) PCT No.: PCT/CN2012/073238
§ 371 (c)(1),
(2), (4) Date: Nov. 15, 2013

(87) PCT Pub. No.: WO2013/143100
PCT Pub. Date: Oct. 3, 2013

(65) Prior Publication Data
US 2015/0024749 A1 Jan. 22, 2015

(51) Int. Cl.
*H04W 36/00* (2009.01)
*H04W 48/16* (2009.01)
(Continued)

(52) U.S. Cl.
CPC .......... *H04W 36/32* (2013.01); *H04W 36/0083* (2013.01); *H04W 48/16* (2013.01); *H04W 36/04* (2013.01)

(58) Field of Classification Search
CPC . G08G 1/167; H04W 36/0083; H04W 36/04; H04W 36/32; H04W 36/08; H04W 36/0011; H04W 36/0066; H04W 84/12; H04W 84/045; H04W 12/06; H04L 63/0869
See application file for complete search history.

(56) References Cited

U.S. PATENT DOCUMENTS

| | | | |
|---|---|---|---|
| 2007/0274259 A1* | 11/2007 | Sayegh et al. | 370/331 |
| 2010/0113035 A1 | 5/2010 | Eskicioglu et al. | |
| 2011/0194530 A1* | 8/2011 | Tinnakornsrisuphap et al. | 370/331 |

FOREIGN PATENT DOCUMENTS

| | | |
|---|---|---|
| CN | 1852568 A | 10/2006 |
| EP | 2384054 A1 | 11/2011 |
| WO | WO-2013143100 A1 | 10/2013 |

OTHER PUBLICATIONS

Chiu-Ching Tuan A Compact normal walk model for PCS networks with Mesh cell configuration Journal of the Chinese institute of Engineers vol. 28 No. 4 pp. 677-690 (2005).*

(Continued)

*Primary Examiner* — Nizar Sivji
(74) *Attorney, Agent, or Firm* — Schwegman Lundberg & Woessner, P.A.

(57) ABSTRACT

Embodiments of user equipment (UE) and method for pico-cell attachment and attachment inhibiting are generally described herein. In some embodiments, the UE may determine an angle threshold, calculate an angle between a moving direction and a direction toward the target pico eNB, permit pico-cell attachment if the calculated angle is less than or equal to the angle threshold and inhibit pico-cell attachment when the calculated angle is greater than the angle threshold. In some angle-limitation embodiments, the UE may be configured to receive the angle threshold that is broadcasted by a target pico eNB using the SIBs which may be transmitted on the DL-SCH. In some minimum-distance threshold embodiments, the UE is configured to calculate the angle threshold from a distance threshold and a distance to a target pico eNB.

15 Claims, 3 Drawing Sheets

(51) Int. Cl.
*H04W 36/32* (2009.01)
*H04W 36/04* (2009.01)

(56) References Cited

OTHER PUBLICATIONS

"International Application Serial No. PCT/CN2012/073238, International Search Report mailed Jan. 17, 2013", 4 pgs.
"International Application Serial No. PCT/CN2012/073238, Written Opinion mailed Jan. 17, 2013", 3 pgs.
"International Application Serial No. PCT/CN2012/073238, International Preliminary Report on Patentability mailed Oct. 9, 2014", 5 pgs.
"European Application Serial No. 12872397.0, Extended European Search Report mailed Jan. 7, 2016", 8 pgs.
Alcatel-Lucent, et al., "UE-speed-based methods for improving the mobility performance in HetNets", 3GPP Draft; R2-120652-Speed Based Methods for Improving Mobility Performance in Hetnet, 3rd Generation Partnership Project (3GPP), Mobile Competence Centre; 650, Route Des Lucioles; F-06921 Sophia-Antipolis Cedex; France, vol. Ran WG2, (Jan. 31, 2012).

\* cited by examiner

USER EQUIPMENT AND METHOD FOR PICO-CELL ATTACHMENT AND ATTACHMENT INHIBITING

This application is a U.S. National Stage Filing under 35 U.S.C. 371 from International Application No. PCT/CN2012/073238, filed on Mar. 29, 2012, which is incorporated herein by reference in its entirety.

TECHNICAL FIELD

Embodiments pertain to wireless communications. Some embodiments relate to pico-cell attachment in wireless networks, including heterogeneous networks (HetNets). Some embodiments relate to LTE networks including those configured in accordance with the 3GPP TS 36.331 (LTE; Evolved Universal Terrestrial Radio Access (E-UTRA); Radio Resource Control (RRC); Protocol specification).

BACKGROUND

Heterogeneous networks (HetNets) are an attractive means of expanding mobile network capacity. An HetNet may include multiple radio access technologies (RATs), architectures, transmission solutions, and base stations of varying transmission power. HetNets may be able to improve system capacity and user throughput. Some HetNets include macrocells that are served by macro base stations, such as macro evolved node Bs (eNBs), and smaller cells, such as pico cells, that may be served by pico base stations (pico eNBs), One issue with these HetNets is providing seamless connections and robust mobility for user equipment (UE) particularly for transitions between macro and small cells. A small cell may be served by lowed power nodes like RRH (Remote Radio Head), Pico eNBs, HeNBs and Relay nodes, In co-channel HetNet deployment a UE may suffer interference when it is located in the cell-edge district. On the other hand, the Reference Signal Receiving Power (RSRP) from a pico cell varies more quickly compared with that from a macro cell. As a result, when a UE is moving towards or leaving pico cell, it may suffer a higher radio link failure (RLF) and/or a handover failure (HOF) before it hands over to a target cell. This is especially an issue for UEs that are moving at a medium or high speed (i.e., traveling in a car). Frequent handover for medium or high speed UEs results in excess overhead large overhead for both eNBs and UEs. Thus how to enhance the mobility robustness in HetNets becomes an open question in reality.

Thus there are general needs for HetNets with improved capacity and user throughput. There are general needs for HetNets that provide enhanced mobility robustness for UEs. There are also general needs for networks that address UE attachment to pico cells.

DETAILED DESCRIPTION

Figure 1:
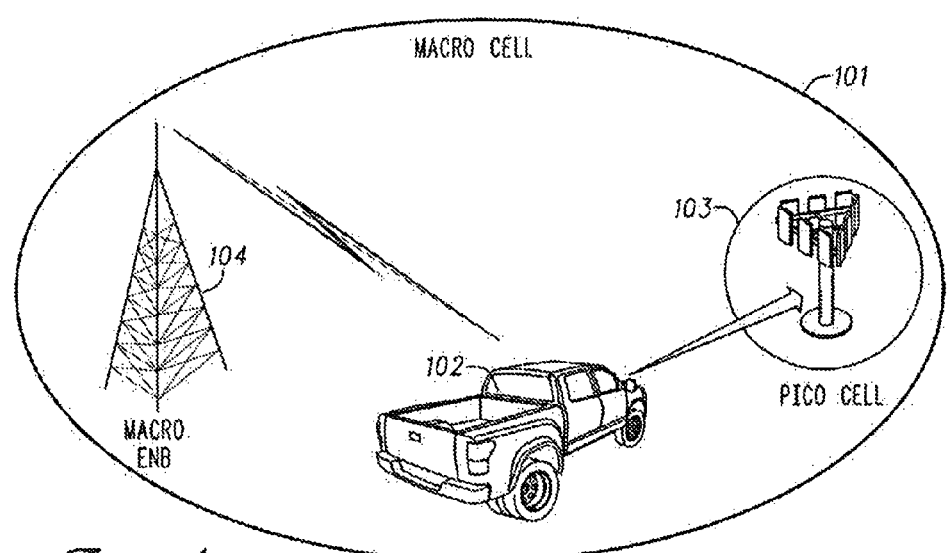
FIG. 1 is a HetNet environment with a macro cell and a pico cell in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with embodiments, a UE may be configured for smart handover. The UE may include processing circuitry to determine an angle threshold, and calculate an angle between a moving direction and a direction toward a target pico eNB. The processing circuitry may permit pico-cell attachment when the calculated angle is less than or equal to the angle threshold, and may inhibit pico-cell attachment when the calculated angle is greater than the angle threshold.

In some embodiments, the UE may also include physical layer circuitry. In sonic angle-limitation, the physical layer circuitry may be configured to receive the angle threshold broadcasted by the target pico eNB. The angle threshold may broadcasted by the target pico eNB using the SIBs that are transmitted on a downlink-shared channel (DL-SCH).

In some minimum-distance threshold embodiments, the processing circuitry may be configured to calculate the angle threshold from a distance threshold and a distance to the target pico eNB. In these minimum-distance threshold embodiments, the angle threshold $\theta_{thre}$ may be calculated based on the equation $\theta_{thre}=\arcsin(d_{thre}/D)$, where D is the distance from the UE to the target pico eNB and $d_{thre}$ is the distance threshold. In some of these minimum-distance threshold embodiments, the distance threshold $d_{thre}$ may be set to minimize radio link failure (RLF) and handover failure (HOF).

In some embodiments, the physical layer circuitry may communicate with a macro eNB and the target pico eNB in accordance with an OFDMA technique using two or more antennas. In some embodiments, the macro eNB and the target pico eNB may be part of a co-channel heterogeneous network (HetNet). In some embodiments, the OFDMA technique may be either an FDD that uses different uplink and downlink spectrum or a TDD technique that uses the same spectrum for uplink and downlink. The physical layer circuitry may be configured to measure parameters on reference signal including at least one of RSRP (Reference Signal Received Power) and RSRQ (Reference Signal Received Quality) for handover and triggering an event A3.

In some embodiments, a method performed by UE for smart handover is provided. In these embodiments, the method may comprise determining an angle threshold, calculating an angle between a moving direction and a direction toward a target pico eNB, permitting pico-cell attachment when the calculated angle is less than or equal to the angle threshold, and inhibiting pico-cell attachment when calculated angle is greater than the angle threshold.

In some angle-limitation embodiments, the method may include receiving the angle threshold broadcasted by the target pico eNB. The angle threshold may be broadcasted by the target pico eNB using the SIBs that are transmitted on a downlink-shared channel (DL-SCH).

In some minimum-distance threshold embodiments, the method includes calculating the angle threshold from a distance threshold and a distance to the target pico eNB. The angle threshold $\theta_{thre}$ may be calculated based on the equation $\theta_{thre}=\arcsin(d_{thre}/D)$, where D is the distance from the UE to the target pico eNB and $d_{thre}$ is the distance threshold. The distance threshold $d_{thre}$ may be set to minimize radio link failure (RLF) and handover failure (HOF).

In some embodiments, the UE is configured to determine a trajectory with respect to a target pico enhanced node B (eNB), and either permit or inhibit pico-cell attachment based on the trajectory. In these embodiments, the trajectory comprises the moving direction of the UE.

FIG. 1 is a HetNet environment in accordance with some embodiments. In cellular networks, when a mobile device, such as user equipment (UE) 102 moves from cell to cell and performs cell selection/reselection and handover, it may measure the signal strength/quality of the neighbor cells. In accordance with LTE embodiments, a UE 102 may measure two parameters on reference signal: RSRP (Reference Signal Received Power) and RSRQ (Reference Signal Received Quality). In the HetNet environment illustrated in FIG. 1, the pico cell 103 has smaller coverage compared with the macro cell 101. In a co-channel HetNet in which the pico cell and the macro cell utilize the same spectrum, the UE 102 would suffer interference from both the macro cell 101 and the pico cell 103. When the UE 102 is moving towards or leaving the pico cell 103 and pico Cell's RSRP or RSRQ is lower than a predefined measurement, the UE 102 may perform a handover procedure.

However, as the RSRP or RSRQ from the pico cell 103 changes more dramatically, the target cell for handover, mainly the pico cell 103, is not always reliable. A typical example of this issue is when UE 102 is moving towards pico cell 103 tangentially or is leaving the pico cell 103. In this situation, the UE 102 may suffer a higher connection drop probability if the UE 102 performs a handover procedure and hands over to the pico cell 103. On the other hand, if pico-cell attaching is forbidden for a LIE moving towards the pico cell 103, a high connection drop probability may also result.

In accordance with embodiments, one solution to enhance the mobility robustness is to perform a smart handover to the pico cell 103. The smart handover may be based on the relationship between the direction that the UE 102 is moving and HetNet's geometric deployment. This smart handover to pico cell 103 may be explained as a pico-cell attaching limitation. For some reliable "better cell" found by the UE 102 which is moving in HetNets, pico-cell attaching is allowed. Otherwise, the pico-cell attaching is not allowed. These embodiments are described in more detail below.

In some embodiments, to implement this smart handover scheme, several conditions may be necessary. First, the pico cell geometric deployment in HetNets should be available for the UE 102. Second, the accurate position of the UE 102 should be available. Third, the cell type information of the target cell may need to be acquired by the UE 102.

In these embodiments, two embodiments can be used to implement the smart handover.

Figure 2:
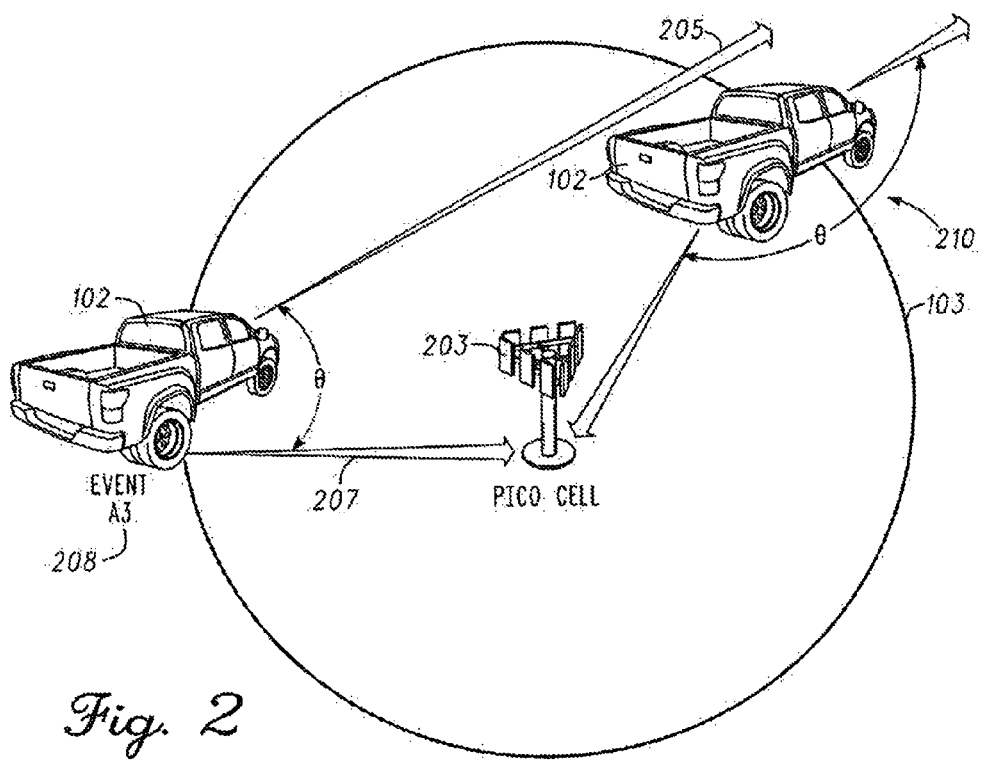
FIG. 2 is a HetNet environment illustrating angle-limitation embodiments.

Angle-Limitation Embodiments:

Referring to FIG. 2, an angle threshold, $0 \leq \theta_{thre} \leq 180$, may be defined which may be used by the UE 102 to determine whether to ignore the pico cell 103. The eNB 203 may periodically broadcast the angle threshold using system information blocks (SIBS) which may be transmitted on the downlink- shared channel (DL-SCH).

When the neighbor cell is a pico cell, such as pico cell 103, and event A3 208 is going to be triggered, the UE 102 may calculate the angle θ between its moving direction 205 and the line 207 from the UE 102 to the target eNB (e.g., pico eNB), as shown in FIG. 2. If the calculated angle is less than or equal to the angle threshold ($\theta <= \theta_{thre}$) it is determined that the UE 102 would move across the pico cell 103 and pico-cell attaching may be permitted or allowed. Otherwise, if ($\theta > \theta_{thre}$) it may be determined that he UE 102 would move towards the pico cell 103 tangentially or leave the pico cell 103 (as indicated by reference number 210) and the pico cell 103 may be ignored by the UE 102. In this way, the RLF, HOF, and handover frequency may be reduced. This may also result in reduced power consumption by the UE 102 if the pico cell 103 is ignored.

The mobility robustness enhancement of these embodiments may be heavily dependent on the setting of angle threshold $\theta_{thre}$. If the angle threshold $\theta_{thre}$ is set too small, some UEs which were supposed to handover to target pico cell would not have been allowed and the UE would be inhibited from attaching to attach to the pico cell 103. As a result, more HOF and RLF may be incurred. On the other hand, if the threshold $\theta_{thre}$ is set too large, it may be difficult to effectively support a pico-cell attaching limitation.

In some embodiments, several conditions and terms may be defined and implemented.

Inequality A3-1 (Entering condition)

Mn+Ofn+Ocn−Hys>Mp+Ofp+Ocp+Off

If the neighbor cell is a pico cell, Ag≤Agt should be also fulfilled. The variables in the formula may be defined as follows:

In these embodiments, Ag is the angle between UE moving direction and the line from UE to neighbor eNB, and is measured when neighbor cell is pico cell. Agt is the angle threshold, used to judge whether to ignore the pico cell, and is set to zero if no pico cell is deployed in network (i.e. Angle Threshold as defined within System Information Block Type 4).

In these embodiments, Mn, Mp may be expressed in dBm in case of RSRP, or in dB in case of RSRQ. Ofn, Ocn, Ofp, Ocp, Hys, Off may be expressed in dB. Ag, Agt may be expressed in degrees.

```
ASN1START
SystemInformationBlockType4 ::=      SEQUENCE {
    intraFreqNeighCellList               IntraFreqNeighCellList      OPTIONAL, -
- Need OR
    intraFreqBlackCellList               IntraFreqBlackCellList
    OPTIONAL,   -- Need OR
    csg-PhysCellIdRange                  PhysCellIdRange             OPTIONAL, -
- Cond CSG
    ...,
    AngleThreshold                       AngleThreshold              OPTIONAL --
Need OR
    lateNonCriticalExtension             OCTET STRING                OPTIONAL
-- Need OP
}
IntraFreqNeighCellList ::=           SEQUENCE (SIZE (1..maxCellIntra)) OF
```

-continued

```
IntraFreqNeighCellInfo
IntraFreqNeighCellInfo ::=         SEQUENCE {
    physCellId                         PhysCellId,
    q-OffsetCell                       Q-OffsetRange,
    ...
}
IntraFreqBlackCellList ::=         SEQUENCE (SIZE (1..maxCellBlack)) OF
PhysCellIdRange
AngleThreshold ::=                 INTEGER (0,..,180)
-- ASN1STOP
```

| System Information Block Type 4 field descriptions |
| --- |
| csg-PhysCellIdRange |
| Set of physical cell identities reserved for CSG cells on the frequency on which this field was received. The received csg-PhysCellIdRange applies if less than 24 hours has elapsed since it was received and it was received in the same primary PLMN. The 3 hour validity restriction (section 5.2.1.3) does not apply to this field. |
| intraFreqBlackCellList |
| List of blacklisted intra-frequency neighbouring cells. |
| intraFreqNeighbCellList |
| List of intra-frequency neighbouring cells with specific cell re-selection parameters. |
| q-OffsetCell |
| Parameter "Qoffset$_{s,\,n}$" per TS 36.304. |
| Anglethreshold |
| Angle threshold between UE moving direction and the line from UE to Pico eNB, unit degree. |

Minimum-Distance Threshold Embodiments

Figure 3:
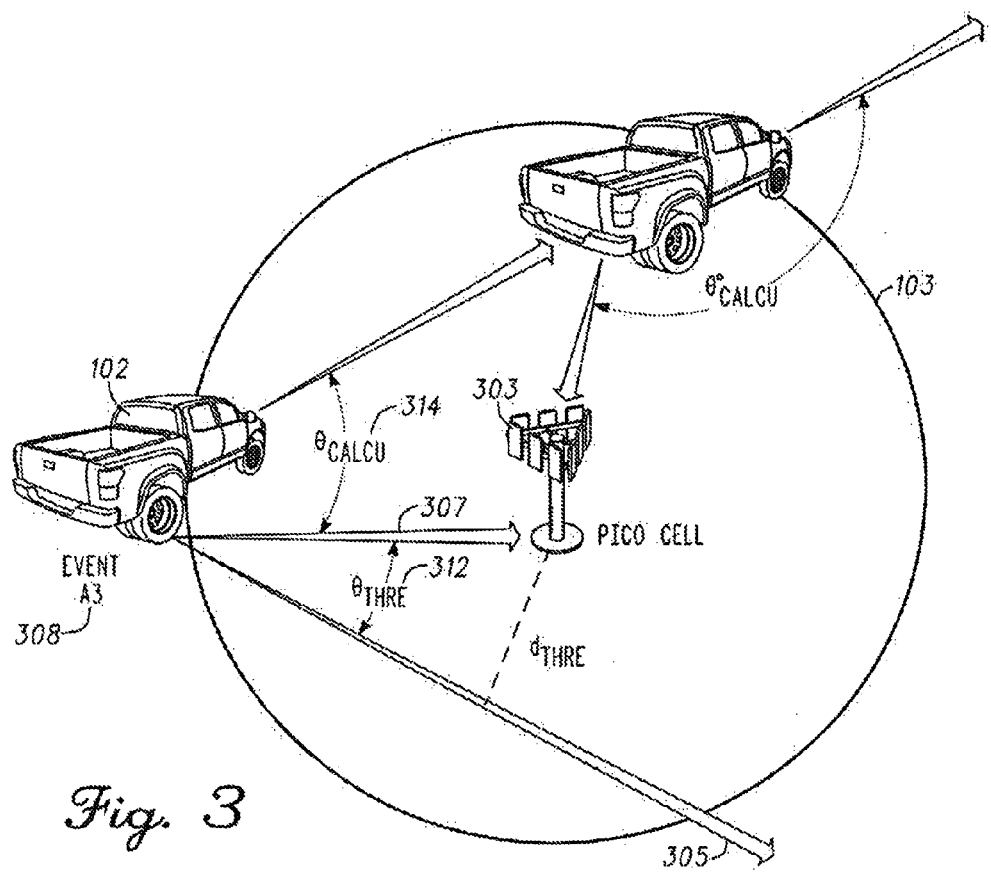
FIG. 3 is a HetNet environment illustrating minimum-distance threshold embodiments.

Referring to FIG. 3 in these embodiments, a minimum distance threshold ($d_{thre}$>0) may be defined. According to the $d_{thre}$, the UE 102 may calculate the minimum angle threshold based on the following equation: $\theta_{thre}=\arcsin(d_{thre}/D)$, where D is the distance from the UE 102 to a neighbor eNB, and $0 \leq \theta_{thre} \leq 180$. Unlike the angle-limitation embodiments described above, the angle threshold $\theta_{thre}$ is these embodiments not a constant value. In these embodiments, the angle threshold varies based on the minimum distance threshold $d_{thre}$ and the distance D between the UE 102 and the pico eNB 303. The bigger the $d_{thre}$ is, accordingly, the larger the $\theta_{thre}$ is after calculated at the same the distance D. On the other hand, the $\theta_{thre}$ would increase when the distance D is decreasing between the UE 102 and the pico eNB 303 while the $d_{thre}$ remains unchanged.

In these minimum-distance threshold embodiments, when the neighbor cell is pico cell and event A3 308 is going to be triggered, the UE 102 may calculate the angle $\theta_{calcu}$ 314 and $\theta_{thre}$ 312, where $\theta_{calcu}$ is the angle between its moving direction 305 and the line 307 from the UE 102 to target pico eNB 303. If $\theta_{calcu}<=\theta_{thre}$, pico-cell attaching may be allowed; otherwise, pico-cell attached may not be allowed. In these embodiments, the UE 102 judges whether to ignore the pico cell 103 based on a predicted minimum distance.

Similar to the angle-limitation embodiments described above, in the minimum-distance threshold embodiments, the mobility performance is heavily dependent on the setting of the minimum distance threshold $d_{thre}$. If a large minimum distance threshold $d_{thre}$ is set, it may be difficult to effectively limit pico-cell attaching. On the other hand, if a small minimum distance threshold $d_{thre}$ is set, a high RLF or high HOF may result. However, RLF, HOF, and handover frequency could be reduced if a proper configuration is set.

To implement these embodiments, several conditions and terms may be defined.

Inequality A3-1 (Entering condition)
If the neighbor cell is not a pico cell:
Mn+Ofn+Ocn−Hys>Mp+Ofp+Ocp+Off
If the neighbor cell is a pico cell, Ag≤Agt should be also fulfilled. The variables in the formula are defined as follows: Ag is the angle between the moving direction of the UE 102 and the line from the UE 102 to the neighbor eNB 303 and is measured when the neighbor cell is a pico cell. Agt is the angle threshold, used to judge whether to ignore the pico cell and may be set to zero if no pico cell is deployed in network (e.g., arcsin(Distance Threshold/D), where DistanceThreshold as defined within the System Information Block Type 4, and D is the distance between UE and the neighbor eNB). Mn, Mp may be expressed in dBm in case of RSRP, or in dB in case of RSRQ. Ofn, Ocn, Ofp, Ocp, Hys, Off are expressed in dB. Ag, Agt are expressed in degree.

```
-- ASN1START
SystemInformationBlockType4 ::=    SEQUENCE {
    intraFreqNeighCellList             IntraFreqNeighCellList      OPTIONAL, -
- Need OR
    intraFreqBlackCellList             IntraFreqBlackCellList
        OPTIONAL,   -- Need OR
    csg-PhysCellIdRange                PhysCellIdRange             OPTIONAL, -
- Cond CSG
    ...,
    DistanceThreshold                  DistanceThreshold           OPTIONAL
-- Need OR                             OCTET STRING                OPTIONAL
    lateNonCriticalExtension
}
IntraFreqNeighCellList ::=         SEQUENCE (SIZE (1..maxCellIntra)) OF
IntraFreqNeighCellInfo
IntraFreqNeighCellInfo ::=         SEQUENCE {
    physCellId                         PhysCellId,
```

-continued

```
    q-OffsetCell              Q-OffsetRange,
    ...
}
IntraFreqBlackCellList ::=    SEQUENCE (SIZE (1..maxCellBlack)) OF
PhysCellIdRange
DistanceThreshold ::=         INTEGER (0,..,100)
-- ASN1STOP
```

| SystemInformationBlockType4 field descriptions |
|---|
| csg-PhysCellIdRange |
| Set of physical cell identities reserved for CSG cells on the frequency on which this field was received. The received csg-PhysCellIdRange applies if less than 24 hours has elapsed since it was received and it was received in the same primary PLMN. The 3 hour validity restriction (section 5.2.1.3) does not apply to this field. |
| intraFreqBlackCellList |
| List of blacklisted intra-frequency neighbouring cells. |
| intraFreqNeighbCellList |
| List of intra-frequency neighbouring cells with specific cell re-selection parameters. |
| q-OffsetCell |
| Parameter "Qoffset$_{s,\,n}$" in TS 36.304. |
| DistanceThreshold |
| Distance threshold between the position of UE and the neighbor Pico eNB, unit meter. |

Figure 4:
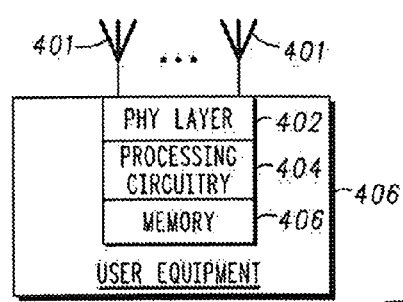
FIG. 4 is a block diagram of a UE in accordance with embodiments.

FIG. 4 is a block diagram of a UE in accordance with embodiments. UE 400 may be suitable for use as UE 102 described above in FIGS. 1, 2 or 3. The UE 400 may include physical layer circuitry 402 for transmitting and receiving signals to and from eNBs using one or more antennas 401. UE 400 may also include processing circuitry 404 that may include, among other things a channel estimator. UE 400 may also include memory 406. The processing circuitry may be configured to determine several different feedback values discussed below for transmission to the eNB. The processing circuitry may also include a media access control (MAC) layer.

In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 301 utilized by the UE 300 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 400 may be configured with the instructions to perform the operations described herein.

In some embodiments, the UE 400 may be configured to receive OFDM communication signals over a multicarrier communication channel. The OFDM signals may comprise a plurality of orthogonal subcarriers. In sonic broadband multicarrier embodiments, eNBs (including macro eNB 104 and pico eNBs 103, 203 and 303 (see FIGS. 1, 2 and 3)) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 400 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, Dec. 2010, including variations and evolutions thereof In some other embodiments, the UE 400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. Although FIGS. 1-3 illustrate that the UE 400 may be operating within an automobile (i.e., a pickup truck), the scope of the embodiments is not limited in this respect.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

In some LTE embodiments, the basic unit of the wireless resource is the Physical Resource Block (PRB). The PRB may comprise 12 sub-carriers in the frequency domain x 0.5 ms in the time domain. The PRBs may be allocated in pairs (in the time domain). In these embodiments, the PRB may comprise a plurality of resource elements (REs), A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

Figure 5:
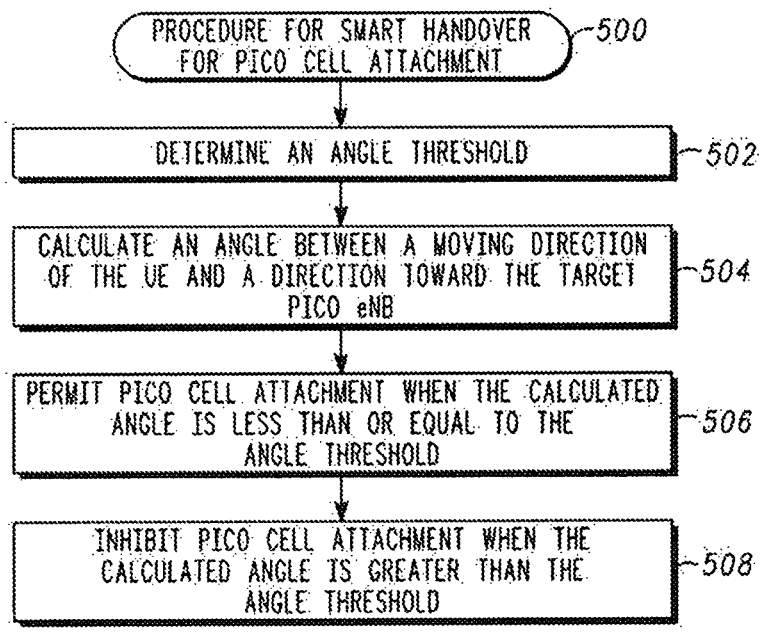
FIG. 5 is a flow chart of a procedure for smart handover for pico-cell attachment in accordance with some embodiments.

FIG. 5 is a flow chart of a procedure for smart handover for pico-cell attachment in accordance with some embodiments. Procedure 500 may be performed by a UE, such as UE 400 (FIG. 4) although the scope of the embodiments is not limited in this respect.

In operation 502, the UE may determine an angle threshold.

In operation 504, the UE may calculate an angle between a moving direction of the UE and a direction toward the target pico eNB.

In operation 506, the UE may permit pico-cell attachment when the calculated angle is less than or equal to the angle threshold.

In operation 508, the UE may inhibit pico-cell attachment w the calculated angle is greater than the angle threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) configured for smart handover in a 3GPP LTE network, the UE comprising:
    comprising physical layer circuitry to communicate with enhanced Node Bs (eNBs) including macro eNBs and pico eNBs; and
    processing circuitry configured for initiating handovers including macro-cell to pico-cell handovers and macro-cell to macro-cell handovers,
    wherein for macro-cell to pico-cell handovers when the UE is attached to a serving macro eNB, the processing circuitry is configured to:
    determine a trajectory of the UE; and
    either permit or inhibit pico-cell attachment based on the trajectory of the UE and a direction toward a target pico eNB;
    wherein to determine whether pico-cell attachment is permitted or inhibited, the processing circuitry is further arranged to:
    calculate an angle between the trajectory of the UE and the direction toward the target pico eNB;
    permit pico-cell attachment when the calculated angle is less than or equal to an angle threshold; and
    inhibit pico-cell attachment when the calculated angle is greater than the angle threshold,
    when pico-cell attachment is permitted, initiate a macro-cell to pico-cell handover from the serving macro eNB to the target pico eNB based on signal level measurements of the serving macro eNB to the target pico eNB, and
    when pico-cell attachment is inhibited, refrain from initiating a macro-cell to pico-cell handover, and
    wherein for macro-cell to macro-cell handovers, the processing circuitry is configured to initiate a macro-cell to macro-cell handover from the serving macro eNB to a target macro eNB without use of the trajectory.

2. The UE of claim 1 wherein the physical layer circuitry is configured to receive the angle threshold broadcasted by the target pico eNB.

3. The UE of claim 2 wherein the angle threshold is received by the UE within system information blocks (SIBs) that are broadcasted by the target pico eNB on a downlink-shared channel (DL-SCH).

4. The UE of claim 1 wherein for macro-cell to pico-cell handovers, the processing circuitry is configured to calculate the angle threshold from a distance threshold and a distance to the target pico eNB.

5. User Equipment (UE) configured for smart handover, the UE comprising processing circuitry to:
  determine a trajectory with respect to a target pico enhanced node B (eNB); and
  either permit or inhibit pico-cell attachment based on the trajectory,
  wherein to determine the trajectory, the processing circuitry is arranged to:
  determine an angle threshold; and
  calculate an angle between a moving direction of the UE and a direction toward the target pico eNB, and
  wherein the processing circuitry is further arranged to;
  permit pico-cell attachment when the calculated angle is less than or equal to the angle threshold; and
  inhibit pico-cell attachment when the calculated angle is greater than the angle threshold,
  wherein the processing circuitry is configured to calculate the angle threshold from a distance threshold and a distance to the target pico eNB,
  wherein the angle threshold $\theta_{thre}$ is calculated based on the equation $\theta_{thre}=\arcsin(d_{thre}/D)$, where D is the distance from the UE to the target pico eNB and $d_{thre}$ is the distance threshold.

6. The UE of claim 5 wherein the distance threshold $d_{thre}$ is set to minimize radio link failure (RLF) and handover failure (HOF).

7. The UE of claim 1 wherein the physical layer circuitry is to communicate with a macro eNB and the target pico eNB in accordance with an orthogonal frequency division multiple access (OFDMA) technique using two or more antennas,
  wherein the macro eNB and the target pico eNB are part of a co-channel heterogeneous network (HetNet), and
  wherein the UE is configured to either receive the angle threshold broadcasted by the target pico eNB or is configured to calculate the angle threshold from a distance threshold and a distance to the target pico eNB.

8. The UE of claim 7 wherein the OFDMA technique is either an frequency-division duplex (FDD) that uses different uplink and downlink spectrum or a time-division duplex (TDD) technique that uses the same spectrum for uplink and downlink,
  wherein the physical layer circuitry is configured to measure parameters on reference signal including at least one of RSRP (Reference Signal Received Power) and RSRQ (Reference Signal Received Quality) for handover and triggering an event A3.

9. A method performed by a user equipment (UE) for smart handover in a 3GPP LTE network, the UE configured to communicate with enhanced Node Bs (eNBs) including macro eNBs and pico eNBs and configured for initiating handovers including macro-cell to pico-cell handovers and macro-cell to macro-cell handovers, the method comprising:
  determining an angle threshold;
  wherein for macro-cell to pico-cell handovers when the UE is attached to a serving macro eNB, the method comprises:
  calculating an angle between a trajectory of the UE and a direction toward a target pico enhanced node B (eNB);
  permitting pico-cell attachment when the calculated angle is less than or equal to the angle threshold; and
  inhibiting pico-cell attachment when the calculated angle is greater than the angle threshold,
  wherein when pico-cell attachment is permitted, the method includes initiating a macro-cell to pico-cell handover from the serving macro eNB to the target pico eNB based on signal level measurements of the serving macro eNB to the target pico eNB,
  when pico-cell attachment is inhibited, the method includes refraining from initiating a macro-cell to pico-cell handover, and
  wherein for macro-cell to macro-cell handovers, the method includes initiating a macro-cell to macro-cell handover from the serving macro eNB to a target macro eNB without use of the trajectory.

10. The method of claim 9 further comprising receiving the angle threshold broadcasted by the target pico eNB.

11. The method of claim 10 wherein the angle threshold is broadcasted by the target pico eNB using the SIBS that are transmitted on a downlink-shared channel (DL-SCH).

12. The method of claim 9 further comprising calculating the angle threshold from a distance threshold and a distance to the target pico eNB.

13. The method of claim 12 wherein the angle threshold $\theta_{thre}$ is calculated based on the equation $\theta_{thre}=\arcsin(d_{thre}/D)$, where D is the distance from the UE to the target pico eNB and $d_{thre}$ is the distance threshold,
  wherein the distance threshold $d_{thre}$ is set to minimize radio link failure (RLF) and handover failure (HOF).

14. A user equipment (UE) configured to operate in a co-channel heterogeneous network (HetNet) comprising a macro eNB and a target pico eNB,
  wherein, the UE is configured to determine an angle threshold for macro-cell to pico-cell handovers, calculate an angle between a moving direction of the UE and a direction toward a target pico eNB, permit pico-cell attachment when the calculated angle is less than or equal to the angle threshold, inhibit pico-cell attachment when the calculated angle is greater than the angle threshold, and
  wherein the UE is configured to either receive the angle threshold broadcasted by the target pico eNB or is configured to calculate the angle threshold from a distance threshold and a distance to the target pico eNB,
  wherein when pico-cell attachment is permitted, the UE is configured to initiate a macro-cell to pico-cell handover from the serving macro eNB to the target pico eNB based on signal level measurements of the serving macro eNB to the target pico eNB, and
  wherein for macro-cell to macro-cell handovers, the UE is configured to initiate a macro-cell to macro-cell handover from the serving macro eNB to a target macro eNB without use of the angle or the angle threshold.

15. A non-transitory computer-readable storage medium that stores instructions for execution by one or more processors of a user equipment (UE) to configure the UE for operation in a co-channel heterogeneous network (HetNet) comprising a macro eNB and a target pico eNB to perform, the UE configured to:
  determine an angle threshold for a macro-cell to pico-cell handover, calculate an angle between a moving direction of the UE and a direction toward a target pico eNB, permit pico-cell attachment when the calculated angle is less than or equal to the angle threshold, inhibit pico-cell attachment when the calculated angle is greater than the angle threshold, and
  wherein the UE is configured to either receive the angle threshold broadcasted by the target pico eNB or is configured to calculate the angle threshold from a distance threshold and a distance to the target pico eNB, wherein when pico-cell attachment is permitted, the UE is configured to initiate a macro-cell to pico-cell handover from the serving macro eNB to the target pico eNB based on signal level measurements of the serving macro eNB to the target pico eNB, and wherein for macro-cell to macro-cell handovers, the UE is configured to initiate a macro-cell to macro-cell handover from the serving macro eNB to a target macro eNB without use of the angle or the angle threshold.

\* \* \* \* \*